June 30, 1970   D. DRANSFIELD ET AL   3,518,652
REMOTE METER READING ATTACHMENT UTILIZING ROTARY SWITCHES
Filed Dec. 7, 1967   5 Sheets-Sheet 1
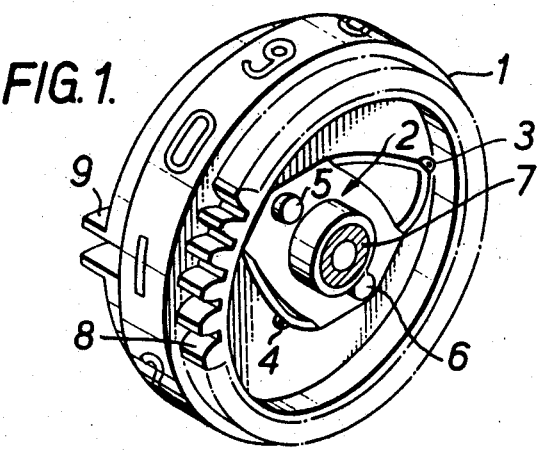
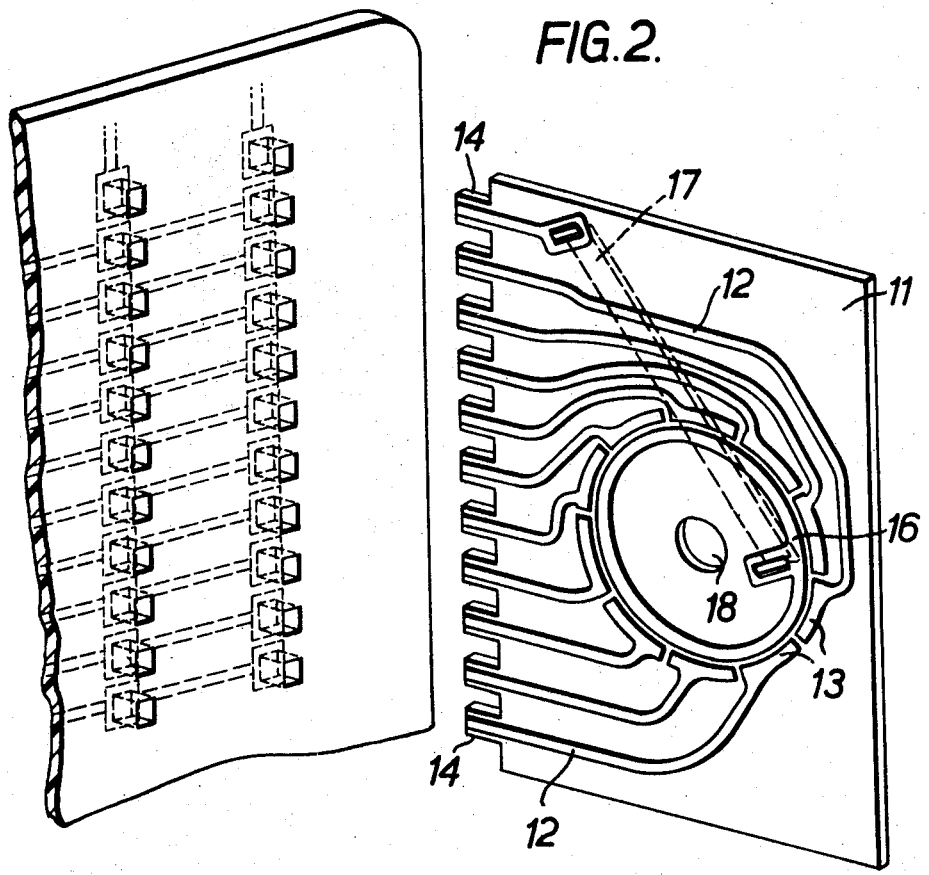

June 30, 1970   D. DRANSFIELD ET AL   3,518,652
REMOTE METER READING ATTACHMENT UTILIZING ROTARY SWITCHES
Filed Dec. 7, 1967   5 Sheets-Sheet 3

June 30, 1970  D. DRANSFIELD ET AL  3,518,652
REMOTE METER READING ATTACHMENT UTILIZING ROTARY SWITCHES
Filed Dec. 7, 1967  5 Sheets-Sheet 4

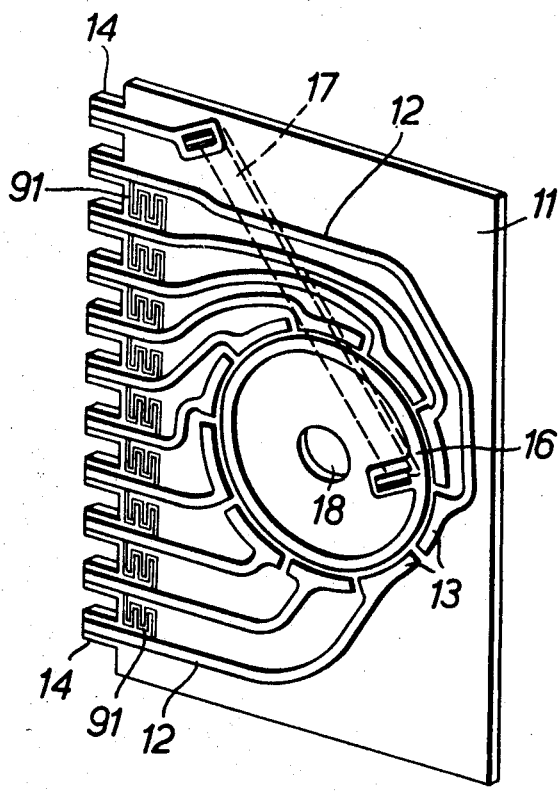

United States Patent Office 3,518,652
Patented June 30, 1970

3,518,652
REMOTE METER READING ATTACHMENT UTILIZING ROTARY SWITCHES
Desmond Dransfield and Patrick Bass, London, England, assignors to United Gas Industries Limited, London, England, a British company
Filed Dec. 7, 1967, Ser. No. 688,791
Int. Cl. G01r 13/04
U.S. Cl. 340—177                    9 Claims

ABSTRACT OF THE DISCLOSURE

An attachment for a meter by means of which the meter reading may be read remotely from the meter includes a rotary switch for each digit wheel of the meter having a number of possible positions each corresponding to a number on the digit wheel, the switches being mechanically intercoupled, means to couple the switches to a drive from the metering mechanism and electrical connections from the switches to a remote location in order to provide information concerning the position of each switch at the remote location.

---

This invention relates to a meter attachment whereby a reading may be taken without actual sight of the index or register thereby allowing a meter reader to read a meter without entering the premises in which a meter is installed. The invention is applicable to meters measuring the supply of gas, electricity or liquids, whether the meter is already in existance or is a meter constructed especially for the purpose of the invention.

The invention thus has among its objects to provide an attachment for association with a meter for the purposes of enabling the reading of the index or register of the meter to be reproduced or otherwise represented remotely from the meter, and in one application of the invention an attachment may be provided that is free of electronic components, such as resistors, inductors, capacitors, transistors and the like, has a high degree of accuracy and may be produced at a low cost.

According to the present invention there is provided an attachment for a meter which may be used in reading remotely a value measured by the meter, and which includes a plurality of switches each one of which represents a respective digit wheel of an index or register for the meter and has a number of possible positions corresponding to the number of digits on such an index or register, coupling means to couple the switches to a drive from the metering mechanism of the meter and a plurality of conductors for providing electrical connections from the switch contacts to a remote location whereby the setting of each of the switches may be distinguished at the said remote location.

The remote location may be a terminal block or socket on the attachment and a multi-wire cable, having a further terminal block or socket and a pin plug device or other means for connections to the first terminal block or socket, may be provided for the transmission of the meter reading to a further remote location.

The attachment in such an arrangement, may be provided, in a comparatively easy manner with means for displaying the meter reading, and it may serve to replace the normal meter index or register.

There may be provided an adaptor plate or fitting by which the attachment may be mounted upon the meter with which it is to be associated and such adaptor plate or fitting may carry a spindle to receive a drive directly from the driving element of the meter index or register, or it may receive such a drive through gearing or by other means whereby the said drive may be transmitted to the attachment.

Electrically operated elements or devices, such as meters or solenoids, may be embodied in the means for operating the switches, or may be otherwise employed, in connections with the reading recorder or receiver. Where the attachment is required in connection with an electricity meter, such elements or devices may be controlled by an impulse contact or contacts provided in connection with the index or register of the meter.

When the attachment is associated with a gas meter, it is advantageously set in fixed relation with the meter, from which the index or register may be removed and an adaptor plate or fitting fitted with a gas-tight joint in the place of the index or register, such as adaptor plate or fitting being adapted to receive the driving spindle of the meter mechanism in a suitable stuffing box, or it may be provided with its own spindle that can be coupled with the driving spindle of the meter mechanism either directly or through gearing. Gearing may also be provided for transmitting the drive from the said spindle to the elements that are to receive it.

In one form of the attachment the elements which receive movement from the driving spindle may comprise a series of rotary switch arms that are co-axially mounted and each of which co-operates with a circular series of fixed contacts in number corresponding with that of the numerals or other indicia of the index or register that has been removed, while the number of the rotary switch arms and corresponding series of fixed contacts is the same as the number of numeral drums or dials of the index or register that are required to be read. The drive from the driving spindle is advantageously imparted only to the first of the rotary switch arms while the remaining rotary switch arms receive a drive from the first arm by way of a Geneva mechanism or transfer pinion, which drives the second rotary switch arm which, in turn, drives the succeeding rotary switch arm by similar means. It is desirable that the rotary switch arms shall move from contact to contact suddenly and for the purpose they are provided with a suitable control mechanism imposing the required sudden movement. The fixed contacts of each series may be respectively connected with corresponding leads, which may form in part the multi-wire cable. The angular positions at any time of the several rotary switch arms give the reading which would have been exhibited by the index or register.

It is desirable to reduce the number of connections in and to the attachment and the number of wires or leads required in the multi-wire cable. Thus, for example, the fixed contacts of the rotary switches which represent similar numerals or other indicia may be connected together, so that if four numeral drums or dials of an index or register are associated with a like number of rotary switch arms and corresponding fixed contacts in the attachment, the contacts representing in each case "0," can be connected together. Similarly the four "1" contacts, the four "2" contacts, and so on up to "9" can also be connected respectively together. There would therefore be only ten connections to the several series of fixed contacts. In addition there would be four connections to the rotary switch arms, making a total of fourteen connections. If, however, twelve numeral drums or dials were in question, the number of connections to the fixed contacts would be ten, as before, and twelve connections to the rotary switch arms, making a total of twenty-two connections.

If the attachment is required to display the reading represented by the positions of the rotary switch arms, then the attachment may include an index or register similar to that normally used in a meter and receiving a drive from the driving spindle. In this case the rotary switch arms may receive a drive either directly from the corresponding numeral drum or pointer of the normal index or register or through gearing which may give, for instance, a 1:1 ratio. The remaining mechanism or components of the attachment may be as before. The multi-wire cable may be connected to a terminal block, plug and socket device or other coupling means as explained above, whereby a recording instrument or receiving device may have its corresponding leads connected with respective leads of the multi-wire cable, which may include at least two leads for the transmission of current.

If the attachment is associated with an electricity meter, it need only be connected with the meter by leads and the only modification required to the meter need be a switch or relay that is operated according to the rotation of the driving spindle of the index or register or of some element coupled thereto. A resulting momentary current or current impulse is applied in the attachment to actuate a responsive feed device, such as a solenoid, which feeds the first rotary arm forward over the fixed contacts co-operating with the said rotary switch arm. Thus, if the switch or relay in the meter is operated once in each revolution of the driving spindle, the first rotary switch arm of the attachment is also fed forward correspondingly. On the resulting completion of one rotation of the said switch arm the second switch arm is also fed forward through one pitch, and so on, with the remaining switch arms. The several arms of the attachment therefore repeat the angular positions of the corresponding numeral drums or pointers of the meter index or register. The operation of the attachment then proceeds as in the case of the association of the attachment with a gas meter.

The invention is essentially concerned with the attachment and the manner in which it is associated with a meter and is impelled to reproduce angular settings corresponding to those of a meter index or register and ways in which it may be connected to a terminal block or the equivalent set at the exterior of the premises in which the meter is installed. The recording instrument or receiving device used by the meter reader may be of any suitable form, according to the manner in which the reading of the meter index or register is required to be made.

An embodiment of the invention will now be described with reference to the accompanying drawings, in which:

FIG. 1 shows a perspective view of a contact wheel;

FIG. 2 shows in perspective a printed circuit board assembly with which the contact wheel shown in FIG. 1 co-operates;

FIG. 7 shows a perspective view of a modified printed circuit board for use with the contact wheel shown in FIG. 1.

Figure 3:
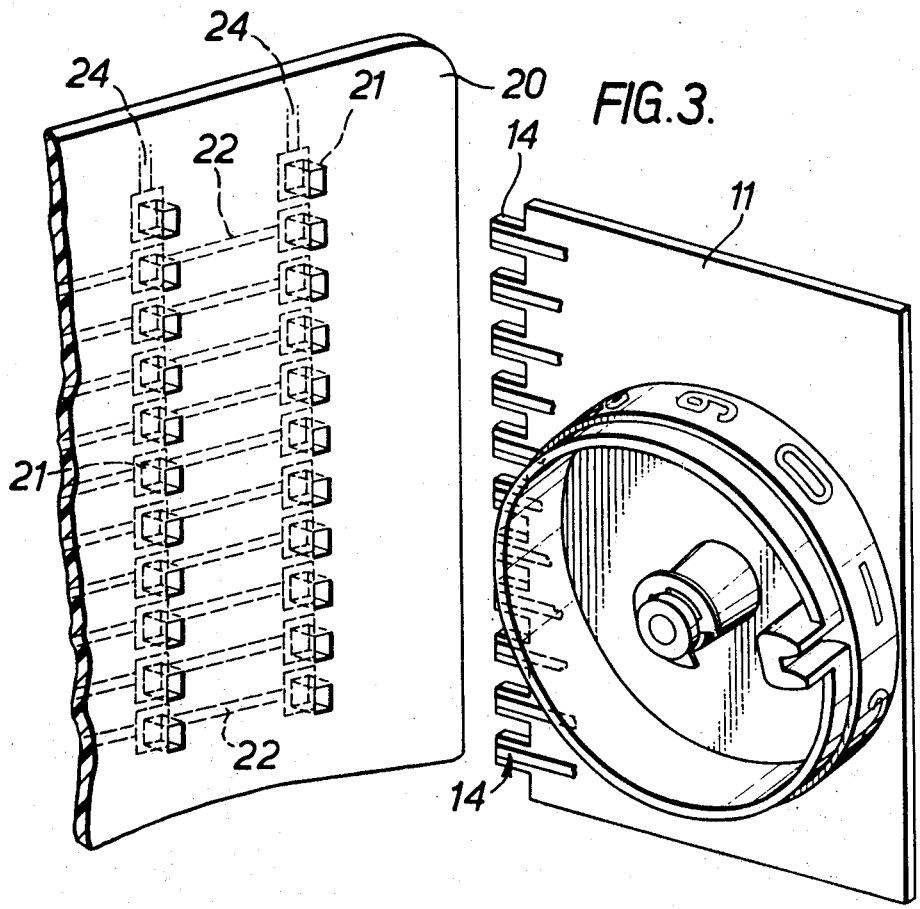
FIG. 3 shows a perspective view illustrating the way in which the contact wheel and the printed circuit board are assembled on a base board.

Referring to FIG. 1 there is shown a wheel 1 which is in fact a modified number wheel from a standard register provided with an electrical bridging connection 2 on which there are contacts 3 and 4, located on pegs 5 and 6 and held in position by means of a bush 7. The contact wheel 1 has on one side a series of teeth 8 and on the other a single transfer tooth 9. It is not essential that numerals be provided around the edge of the wheel in the way shown, but they may be used to provide a visual reading of the wheel position if required.

Referring to FIG. 2 there is shown a printed circuit board 11 having a number of circuit connections 12 which terminate at one end in contacts 13 arranged in a circle. The other ends of the connections 12 terminate on fingers 14 projecting from the board. Within the ring of contacts 13 there is provided a continuous contact ring 16 which is coupled by means of a brass connecting strip 17 arranged on the opposite side of the board from the connections 12 to a terminal point on the upper of the fingers 14. The connections 12, the contacts 13 and the contact ring 16 are formed as printed circuits on the board 11. A hole 18 is provided through the board 11 in the centre of the circle provided by the contacts 13.

Referring to FIG. 3 there is shown a contact wheel 1 assembled on a spindle (not shown) and passing through the hole 18 in a printed circuit board 11 and it may thus be understood from FIGS. 1 and 2 that the contact 3 on the wheel 1 cooperates with the contacts 13 on the printed circuit board while the contact 4 on the wheel 1 cooperates with the contact 16 on the printed circuit board. The printed circuit board is shown arranged for assembly on a base 20 which acts both as a connection board and as a mounting for a number of boards 11 with their respective wheels and it has a number of holes 21 each arranged to take an associated projecting finger 14 from the printed circuit boards 11. On the reverse side of the base board 20 from the printed circuit board 11 there are provided printed circuit connection strips 22 between corresponding ones of a succession of rows of holes 21, each row being arranged to take a row of projecting fingers 14 from printed circuit boards such as that shown at 11 and individual printed circuit connection strips 24 from the upper hole in each row.

Thus there may be arranged on the base board 20 a succession of printed circuit boards 11 each with its own contact wheel 1. Each of the particular connections 13 on the printed circuit boards 11 is connected via the connection strips 22 to similar contacts 13 on the other boards 11, while the upper of the holes in each row in the board 20 has a printed circuit connection strip 24 associated with it which is independent and which is connected to its own respective terminal (not shown) on the board 20.

It is thus possible by rotating each of the wheels 1 to connect electrically a connection strip 24 via contacts 3 and 4 of the respective wheel 1 to any one of the connection strips 22.

The setting of any of the wheels may thus be identified by completing a connection between the respective connection strip 24 and the appropriate connection strip 22 to which the bridging connection 2 is connected.

Figure 4:
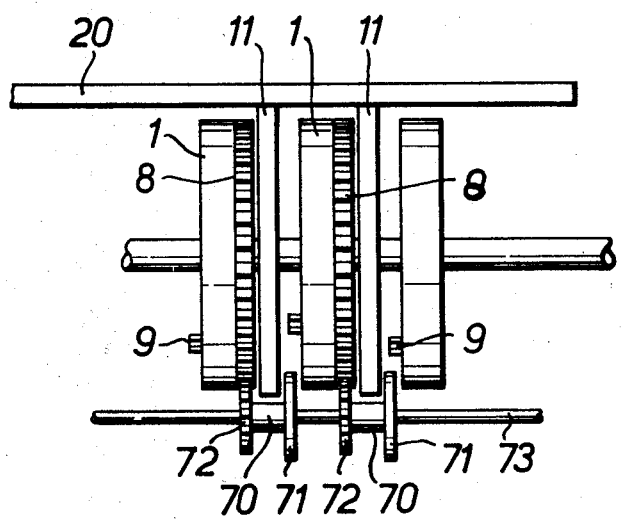
FIG. 4 shows a diagrammatic view of an attachment.

Each of the wheels 1 is thus separated from the other by a printed circuit board 11 as may be seen from FIG. 4 but adjacent wheels are coupled together mechanically by means of a pinion wheel 70, which has teeth 71 and 72 which engage with the transfer tooth 9 on one wheel and the teeth 8 on an adjacent wheel around the edge of each board 11 so that when the first wheel has made a complete revolution the transfer tooth will engage the pinion wheel and cause the adjacent wheel to be rotated one position. A series of these pinion wheels is arranged to be freely rotatable on a shaft 73, and to provide a coupling between the wheels.

The printed circuit connections 12 on the projections 14 of the board 11 are soldered to the connections 22 and 24 on the board 20 after the boards have been assembled in order to provide good circuit connections.

Figure 5:
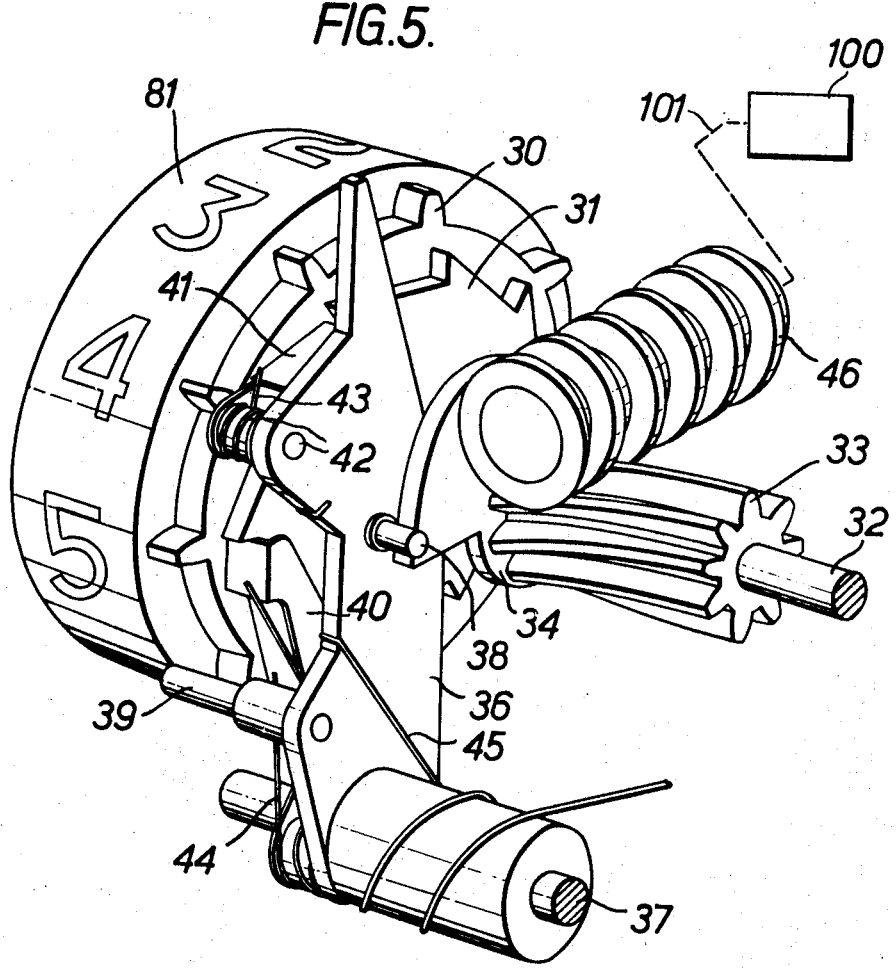
FIG. 5 shows a part of the drive mechanism for the wheel in a perspective view.

Referring to FIG. 5 there is shown a mechanism by means of which it is arranged that the wheels 1 are moved from one position to the next with a snap action. In this figure there is shown a wheel 81 having a transfer tooth 9 (not visible) in a similar way to the wheel previously described but having on its opposite surface an arrangement of teeth 30 which are known as overrun teeth. The wheel 81 does not have any function in the circuit arrangement and has no electrical contacts associated with it. It merely performs a mechanical function and the numerals printed on the edge of the wheel are present simply because the wheel is one of a standard production series. The wheel 81 also has directly connected to it a ratchet wheel 31 and it is mounted on a spindle 32 which carries a worm wheel 33 and a cam 34 fixed to the worm wheel. The assembly, so far as described, consists of a number of parts fixed together to form a whole. On the opposite side of the wheel 81 from the overrun teeth 30 there is a transfer tooth 9 arranged so that it engages a pinion wheel 70 which drives the right-hand one of the assembly of wheels associated with the printed circuit boards 11.

Adjacent the wheel 81 shown in FIG. 5 there is a trip lever 36 which is mounted on a hub and is free to rotate about a spindle 37. The trip lever 36 carries a jump pawl 41 which is mounted on a pin 42 and is held in position against the ratchet wheel 31 by a spring 43, a pin 38 which follows the cam 34 and a pin 39 which, in conjunction with the overrun teeth 30, provide means to stop the wheel 81 overrunning its position. There is also mounted on the spindle 37 a non-return pawl 40 which engages the teeth on the ratchet wheel 31 and prevents the assembly from turning backwards and is held against the ratchet wheel 31 by means of a spring 44. The trip lever 36 is held in position against the cam 34 by means of a spring 45. The worm wheel 33 is driven by a worm 46 which is coupled mechanically to the metering mechanism.

It is not essential that the worm be coupled mechanically to the metering mechanism. It is possible for the metering mechanism to produce electrical signals such as impulses, which drive an electrically operated mechanism 100, which may, for example, be a motor or solenoid operated ratchet and pawl mechanism, coupled mechanically, as indicated by dotted line 101 to the worm 46.

In operation the worm wheel 33 is rotated in a clockwise direction by the worm 46 so that the cam 34 acting on the pin 38 moves the pawl 41 in an anti-clockwise direction until it drops over the edge of a tooth on the ratchet wheel 31. Following this step the cam 34 reaches the position in which the trip lever 36 is moved in the anti-clockwise direction to its maximum extent whereupon during the next step the pin 38 moves off the curved edge of the cam 34 and drops along its straight edge so that the cam follower pin takes up a position at the maximum extent of its clockwise movement. As a result of this action of the cam follower pin 38 moving along the straight edge of the cam 34 and causing the trip lever 36 to move suddenly in a clockwise direction the jump pawl 41 is caused to engage the teeth of the ratchet wheel 31 and to take the assembly rotate, with a jumping action, in the clockwise direction. The non-return pawl 40 maintains the ratchet wheel 31 in position during the movement of the trip lever 36 in the anti-clockwise direction. The overrun stop pin 39 is arranged to come between the teeth 30 and to prevent the assembly from rotating by more than one spacing of the teeth 30. A mechanism is thus provided by means of which a rapid snap action of the drive wheel 81 is obtained while ensuring that the drive wheel is unable either to rotate in an anti-clockwise direction or to rotate by more than one spacing between the teeth at a time.

The wheels, driven through the pinion wheels from the wheel 81, are thus caused to move between contact positions with a swift snap action so that none of contacts 3 is allowed to rest on more than one contact 13 at a time.

Figure 6:
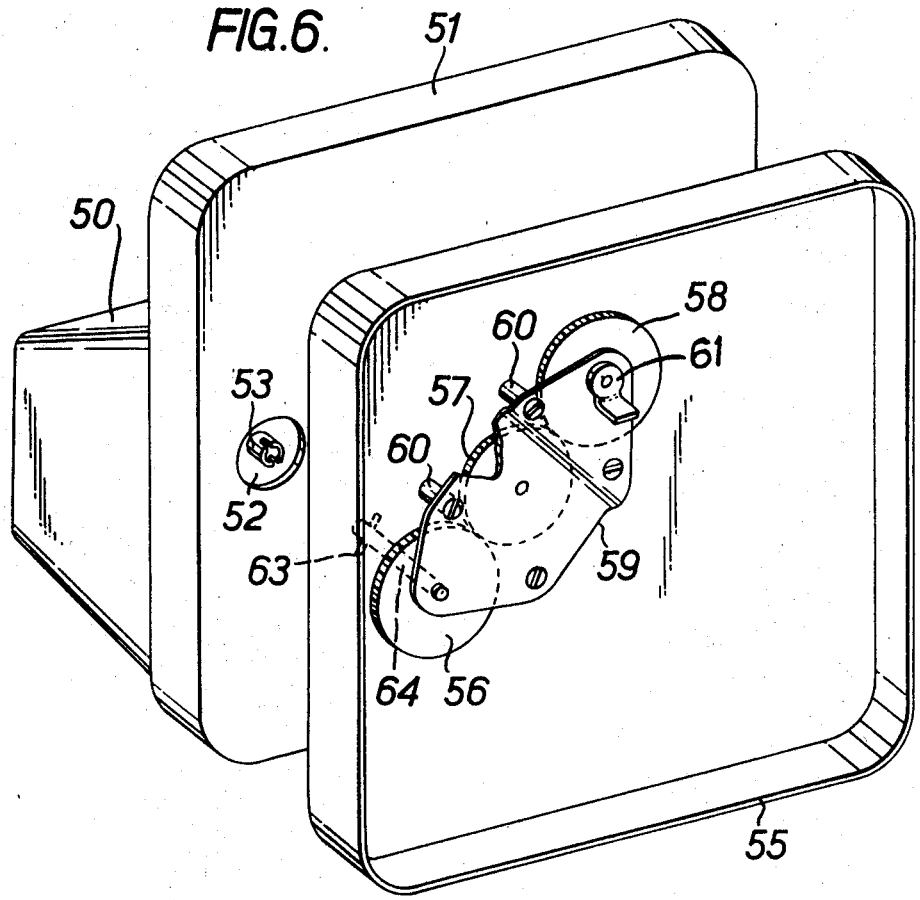
FIG. 6 illustrates by means of a perspective sketch the way in which the assembled mechanism may be coupled to a meter.

Referring to FIG. 6 there is shown an arrangement by means of which the attachment consisting of the index mechanism and the contact wheels may be attached to a meter. The attachment, including the indexing mechanism and contact wheels, is housed in a container 50 which is mounted on a double walled base 51. The base 51 has a hole 52 through which a socket may be engaged. The socket 53 is coupled to the index mechanism housed in the attachment 50 and provides a means for connecting the drive to the index mechanism. The double walled base may be provided with a vent in its side in order to prevent any build up of gas should a leak occur in a meter to which the attachment is connected.

A driving connection between the coupling 53 and a driving shaft in a meter is provided via a gear train mounted on an adaptor plate 55. The adaptor plate may be made of a particular size to suit the meter in question while the attachment 50 and the base plate 51 may be of a standard size. The adaptor plate is designed to fit in the aperture in the meter housing left after the normal index mechanism has been removed, and it is soldered in place in this aperture. The gear mechanism consists of a train of gears 56, 57, 58 running on spindles which are located at one end in the adaptor plate and at the other in a bracket 59 which is spaced from the adaptor plate by means of pillars 60. The length of the pillars is such that when the adaptor plate is soldered in position a drive dog 61 associated with the gear wheel 58 is able to engage the original coupling between the metering mechanism and the normal index mechanism. A drive pin 63 attached to a shaft 64, upon which the gear 56 is mounted, is arranged to engage with the coupling 53 in the double walled base 51. The shaft 64 passes through a stuffing box in the adaptor plate 55. The gear train is arranged to provide a required ratio of the rotation between the output spindle of the metering mechanism and the input spindle of the index attachment 50 so that the correct meter reading is obtainable directly both from the visible dials of the index attachment and remotely from the positions of the associated switches. Of course it may be possible for the drive to be direct or for it to be provided by a 1:1 gear ratio in order to provide a satisfactory coupling between the drive shaft of the metering mechanism and the coupling 53. The base 51 may easily be clamped to the adaptor plate 55 by known means, though of course, the fixing must be such as to give security and to prevent tampering with the reading.

Thus with a mechanism such as that described with reference to FIGS. 1 to 5, contained within the housing 50 shown in FIG. 6, it is possible to provide an indication of the reading of a meter which may be detected electrically at a remote location and thereby enable a corresponding indication to be obtained at that location. With the arrangement shown in FIGS. 2 and 3, it is necessary to provide, between the attachment and the remote location, twelve separate conductors, i.e. one for each commoned digit position on the wheels together with one independent conductor for each wheel. It is then possible, at the remote location, to scan consecutively between the independent conductors connected to the respective connections 24 for each wheel and the ten conductors connected to the commoned connections 22 for each digit position and to determine the setting of the wheel by locating the connection provided by the bridging connection 2 between a particular contact 13 and one of the continuous contacts 16.

The number of conductors necessary between the attachment and the remote location may be reduced by interconnecting the adjacent connections 22 either on the board 20 or on the board 11 as indicated in FIG. 7, with resistors 91 of equal value. These resistors may be printed or deposited on the board, or standard resistors, preferably of high stability, may be used. The other reference numerals correspond to those used in FIG. 2.

With this arrangement it is possible to determine the position of each bridging connection 2 by using only one conductor for each wheel connected to the respective bridging contact 2 and one conductor connected to a commoned connection 22 at the end of each resistor chain. The other common connections 22 are unnecessary. The measurement consecutively at the remote location of the resistance between each conductor connected to a bridging contact 2 and the conductor connected to the commoned connection may be used to provide an indication of the setting of each wheel. The resistance may be measured using a simple Wheatstone bridge circuit. Alternatively by using a third conductor connected to a commoned connection 22 at the opposite ends of the resistor chains it is possible to connect from the remote location a voltage of known value across the resistor chains and to measure in turn, at the remote location, the voltage between each bridging contact 2 and one of the commoned connections in order to determine the position of each bridging connection and thus the setting of its associated wheel.

We claim:

1. An attachment for a meter having a metering mechanism and a drive therefrom, said attachment comprising, in combination:
   (a) a plurality of electrical switches;
   (b) at least one movable contact and a plurality of fixed contacts to each said switch;
   (c) drive means to said movable contacts, effective to move said contacts in response to movement of said meter drive;
   (d) a first terminal on each said switch connected to the movable contact thereof;
   (e) a set of further terminals on each said switch, each further terminal being connected to a separate fixed contact thereof; and
   (f) a plurality of connecting means, connecting corresponding terminals of each set to one another, whereby when said terminal and each of said connecting means are connected to a remote location, the setting of each of the switches may be determined at said location.

2. An attachment as claimed in claim 1, and further comprising a digit wheel coupled to said movable contacts of each of said switches, effective to display the meter reading directly.

3. An attachment as claimed in claim 2, wherein said numbered digit wheels are mechanically intercoupled.

4. An attachment as claimed in claim 1, in which said fixed contacts and set of further terminals of each said switch are formed as a printed circuit on a printed circuit mounting board.

5. An attachment as claimed in claim 4 and further comprising a printed circuit connecting base board having said connecting means formed thereon as a printed circuit, wherein said printed circuit mounting boards are mounted parallel spaced apart formation on said printed circuit connecting base board, effective to form bearings for said movable contacts and to connect said further terminals to said connecting means.

6. An attachment as claimed in claim 1, and further comprising a snap-action mechanism effective to cause the movable contacts to move between adjacent fixed contacts with a snap-action movement.

7. For securing to a meter having a metering mechanism and a drive therefrom, a remote reading attachment comprising, in combination:
   (i) a housing;
   (ii) a plurality of electrical switches within said housing;
   (iii) a movable contact and a plurality of fixed contacts to each said switch;
   (iv) drive means projecting externally of said housing and operatively connected to said movable contacts, effective to move said movable contacts in response to movement of said motor drive;
   (v) a first terminal on each said switch connected to the movable contact thereof; and
   (vi) a set of further terminals on each said switch, each further terminal being connected to a separate fixed contact thereof, whereby when said first terminal and each of said further terminals are connected to a remote location, the setting of each of the switches may be determined at said remote location.

8. An attachment as claimed in claim 7 and further comprising a snap-action mechanism effective to cause the movable contacts to move between adjacent fixed contacts with a snap-action movement.

9. An attachment for a meter having a metering mechanism and a drive therefrom, said attachment comprising, in combination:
   (a) a plurality of electrical switches;
   (b) at least one movable contact and a plurality of fixed contacts to each said switch;
   (c) drive means to said movable contacts, effective to move said contacts in response to movement of said meter drive;
   (d) a first terminal on each said switch connected to the movable contact thereof;
   (e) a set of further terminals on each said switch, each further terminal being connected to a separate fixed contact thereof;
   (f) a plurality of connecting means connecting corresponding terminals of each set to one another; and
   (g) resistance means connecting adjacent connecting means in series, whereby, when said first terminal and one of said connecting means is connected to a remote location, the setting of each of said switches may be distinguished by resistance measurement.

References Cited

UNITED STATES PATENTS

| | | | |
|---|---|---|---|
| 2,253,721 | 8/1941 | Meer | 346—14 |
| 2,414,191 | 1/1947 | Coon | 200—167 |
| 3,072,756 | 1/1963 | Koci | 200—167 |
| 3,132,216 | 5/1964 | Adams | 200—167 |
| 3,222,465 | 12/1965 | Huntress et al. | |
| 3,286,047 | 11/1966 | Heide. | |
| 3,306,993 | 2/1967 | Lien. | |
| 3,046,534 | 7/1962 | Constant | 340—188 |
| 3,331,046 | 7/1967 | Adair | 338—129 |
| 3,376,567 | 4/1968 | Brothman et al. | 340—188 |

J D MILLER, Primary Examiner

G. GOLDBERG, Assistant Examiner

U.S. Cl. X.R.

340—188; 324—113; 338—129; 323—94